June 1, 1943.   M. J. SCHOENBERG ET AL   2,320,832
EDUCATIONAL GAME
Original Filed Dec. 29, 1938   2 Sheets-Sheet 1

INVENTORS
Mark J. Schoenberg
Harry J. Maximon
BY Samuel Ostrolenk
ATTORNEY

June 1, 1943.  M. J. SCHOENBERG ET AL  2,320,832
EDUCATIONAL GAME
Original Filed Dec. 29, 1938   2 Sheets-Sheet 2
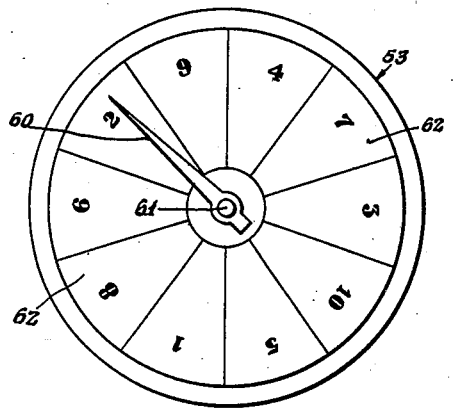
Fig. 2
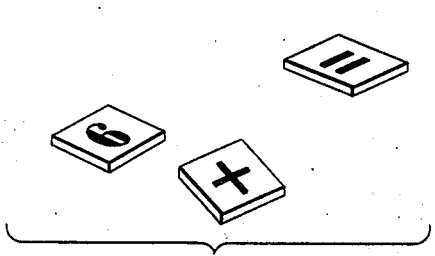
Fig. 4
Fig. 5A
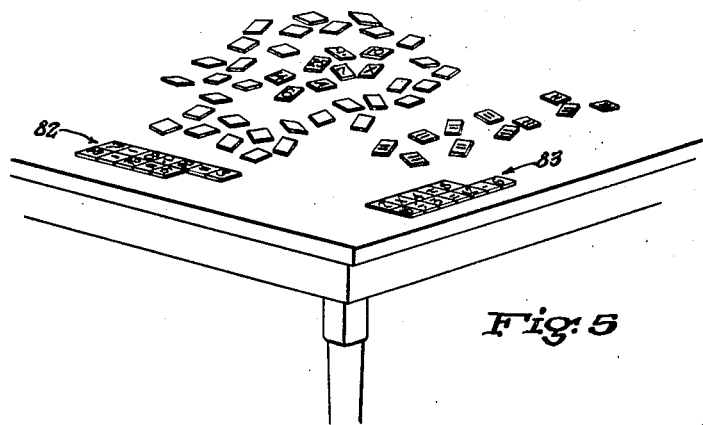
Fig. 5
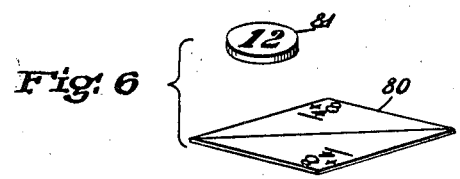
Fig. 6
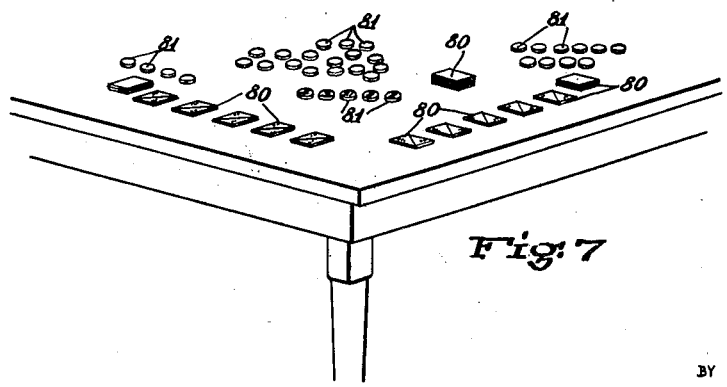
Fig. 7
INVENTORS
Mark J. Schoenberg
Harry J. Maximon
BY Samuel Ostrolenk
ATTORNEY.

Patented June 1, 1943

2,320,832

UNITED STATES PATENT OFFICE 2,320,832

EDUCATIONAL GAME

Mark J. Schoenberg and Harry I. Maximon, New York, N. Y.; said Schoenberg assignor to said Maximon Original application December 29, 1938, Serial No. 248,222. Divided and this application June 14, 1941, Serial No. 398,026

2 Claims. (Cl. 273—130)

This invention relates to games and more particularly to games of educational or pedagogical value whereby a knowledge of mathematics and recognition and understanding of simple mathematical operations of various kinds may be imparted to children.

More specifically, our invention relates to a novel type of game comprising means carrying indicia representing various mathematical operations, the use of which tends to make the response by children to such operations and combinations automatic. The desirability of imparting to children a knowledge of mathematics in such a manner as to render its assimilation easy for them has long been recognized. Many of the various games and devices which hitherto have been presented have lacked attractiveness in that they merely represented a readily discernible imitation of teaching methods and thus have encountered an instinctive negative reaction on the part of the children.

Previously, games which attempted to convey mathematical knowledge have merely comprised review of the problems presented in school, games depending only upon answering or solving the problems in the conventional manner.

There has been no serious attempt to create mathematical games of the type contemplated in this invention in which the element of individual competition among the members of relatively small groups and even between two individuals is present.

We have devised, therefore, a novel game in the conduct of which the pleasurable aspects of mathematics are so presented that the study of this science assures the true zest of a competitive game while at the same time performing the very desirable object of imparting mathematical knowledge. Our game thus does not merely present a predetermined problem which demands a specific answer; but, rather, the problems which may be presented during the game are not known until they arise, thus creating not only the element of surprise, but also the all important element which arises when unknown values and chance factors assist in creating suspense.

Games of the type herein contemplated may thus take many and varied forms while at the same time, the elements of competition, surprise, suspense, chance, zest and excitement arising therefrom are continuously present. In view of this condition, the games, while being of an educational character, may nevertheless be of such a nature as to appeal to adults. The primary educational concept embodied in these games is thus not intended to overwhelm the idea that a game must, by definition, be entertaining.

Objects of this invention therefore are to provide a game which, although its principal element is the presentation and solution of mathematical problems of various kinds, nevertheless retains the elements of individual competition and entertainment;—a type of game which is an effective method of motivating drill in mathematical operations;—a type of game which by adequate repetition insures permanent learning.

Further objects of this invention are to provide a game which will make provision for individual differences and will be readily adjustable to the intelligence, age and development of the particular contestants; to provide a game in which every player is an active participant; to provide a type of game which is adapted both for group and individual instruction; and nevertheless to retain all of the entertaining and interesting qualities which a game should have.

Other objects and uses of our invention will become apparent from the following description taken in connection with the drawings in which:

Figure 1 is a board upon which our game may be played.

Figure 2 represents a dial for use in connection with the game played on the board of Figure 1.

Figure 5 is a general view showing the game in operation.

Figure 5A illustrates arrangement of the parts of a slightly modified form of the game shown in Figure 5.

Figure 6 is a perspective view of card and disk symbols for use in a modified form of our game.

Figure 7 is a view in perspective of the symbols of the type of Figure 6 in use during the game.

Figure 3:
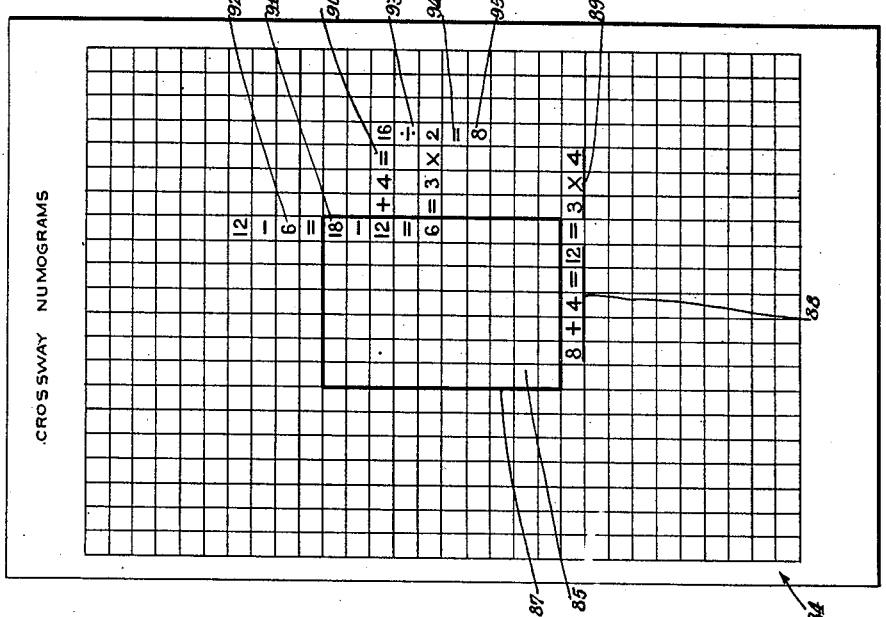
Figure 3 is a board for use in a modified form of the game.

Referring now to Figures 1 and 2, we have here shown a game, which we have denominated "Arabic checkers," which consists of a board 50, two sets of pawns 51 and 52, and a dial 53, Figure 2. The board 50 may be made of wood or cardboard or of any other suitable material and carries thereon a design consisting of a series of squares of two alternating colors or of two shades of one color, the lighter colored squares preferably forming the field on which the game is played.

A series of numbers is printed or inscribed on the lighter squares, one on each square. The arrangement of the series of numbers shown in Figure 1 has by experiment been found to be the most useful and advantageous, although any other series of numbers may, as is hereinafter seen, be used in the construction of the game. The numbers, however, must in the preferred progress from higher numbers to lower numbers; that is, the numbers along the margins 54 and 55 should be the highest numbers and the numbers should thereafter descend in regular order from the margin 55 along the margin 56 and from the margin 54 along the margin 57; the lowest numbers being arranged adjacent the home line or "0" line 58. The line 58 along the central diagonal of the board thus divides the board or field into two equal areas, one for each player and is denominated the "zero" or "home" line.

It will be noted that the two parts of the board are thus harmonious, the numbers on one side of the home line 58 corresponding to the numbers in similar spaces on the other side of the home line.

In order to lend additional interest to the game, a few of the squares on the home line may be designated as safety zones, as seen at 59, 59.

The pawns 51 and 52 may be formed of blocks or disks of any suitable material and shape and are to be used as men on the board 50.

The dial 53 may likewise consist of board, paper, laminated material, metal or any other suitable material and has a spinning indicator 60 rotatably mounted thereon at 61, the face of the dial 53 having a series of zones or areas 62, 62, each of which contain a single number. The indicator or pointer 60 may be spun by hand and the number at which it comes to rest after the spinning operation indicates the nature and type of move that the player may make.

Arabic checkers may be played by two persons: Each player is provided preferably with six men for the particular size board shown herein. Obviously for boards of varying size or numbers of squares or boards having different types of series, a variation in the number of men may be useful; and even in the board 50 here shown, while we have found that six men is the preferred number for each player, variations may be made and each player may start with as few as one or two men, the maximum being limited by the number of spaces available for movement.

In the form where a board as here shown, containing fourteen squares on each side is used and wherein six men are preferred and also wherein the particular series here shown, starting with number 19 is used;—each player starts the game by placing his men 51 and 52, respectively, on the first row in the six squares bearing the numbers 17, 18, 19.

The first player spins the dial, subtracts the number indicated on the dial from the number of the space which any of his men occupy, and moves such man to any square which bears a number equal to the remainder.

The player may, however, move only in a straight line parallel to the edges of the board or diagonally parallel or at right angles to the home line. No single move may be a composite move in which the direction of movement of the pawn or man is changed. Thus, if the number registered by the dial is "3", then, if the player desires to move a man which is on the number 17 to another square, he subtracts 3 from 17 and moves a pawn occupying the space 63 along a line parallel to the edge of the board to the space 64.

The player may, however, desire to move a man from an "18" space, in which case he would move the man diagonally from the space 65 to the space 66.

Thereafter, on a subsequent spin, should the dial again register "3", the player may move any desired pawn from any particular position to any space which carries a number which is three less than the space from which the man is moved, it being necessary, however, to make such move in either a straight or diagonal line. Thus, if on the second move, the number on the dial should be "6", the player may move the man occupying the space 64 to the space 67 or he may move the man occupying the space 68 to the space 69. The next player makes his move in the same way. By repeated subtraction of the dialed numbers, the players continue to move their men to smaller and smaller numbers. In this way, it will be seen that the principles and practice of subtraction are automatically taught in a manner which is neither obvious nor distasteful to the young player while, at the same time, the competitive spirit which should always be present in a true game is not forgotten.

No predetermined problem is presented, the answer to which is known in advance; but rather the player must determine for himself whether to make the particular move indicated by chance alone, whether it is better to make one move than another, whether it is possible to make a certain move, as well as being required to make the mathematical operations required. In this way, the game facilitates not merely a teaching of the mathematical operation of subtraction alone, but assists in developing the judgment and reasoning powers of the young players. Thus, for instance, should the number dialed be "3", then the player would find by test that he could not move a man from the space 63 since no number "16" appears in either a straight or diagonal line from that space. He will also find that he cannot move a man from the space 70 since no number "15" appears in either a straight line or a diagonal line from that space. He must then determine the relative advantages of moving a number from the space 63 or the space 65 to the corresponding spaces 66 and 64 before actually making the move; and mistakes made not only in the actual subtraction but in judgment as well will have a bearing on the result of the game. This element of judgment added to the element of actual subtraction likewise makes this game an entertaining one for adults since the manoeuvring of six men on the board and the choices made in the movement of each of the six men, as well as the combination of such movements, will influence the results of the game.

Various additional rules, however, may be necessary in order to regulate the game in order to insure that the operation of the game itself will result in a victory for one side or the other. Thus, the movements of the men should preferably be limited so that only one man may stand on any square at one time and so that no man may jump over another man.

Each player should try to place all of his men on the zero squares, that is, on the home line and he should try to get as many men as possible on the safety squares; the game being finished when all of the men of one side are on the home line (although the game may not necessarily be won by the party having all of his men on the home line).

The men are always moved from higher numbered squares to lower numbered squares by subtracting, if that is possible. When a player cannot make any move with any of his men by subtracting, he must jump across the home line into the opposing players' territory by going through a process of addition while at all times observing the rule that the men must move in a straight line parallel to the edges of the board or parallel to the home line or at right angles thereto without jumping another man.

The space in the opposing territory to which the man must be moved must bear a number which represents the sum of the number of the space from which the man was moved and the number indicated on the dial. For illustration: where a player has two men left, one in the square 71 and one in the square 67, and then dials the number "7", he cannot move the man in the "8" square into any space bearing the number "1" in his own territory. Nor can he move the man in the "6" square to any space at all in his own territory; nor can he move either of the men to the home line. Therefore he must move the "6" man to the space 72 bearing the number "13" in his opponent's territory whereupon his opponent will capture and remove said man from the board. It should be noted that he would not be able to move the man occupying the space 67 to the space number "15" in the opponent's territory since that would necessitate his jumping his own man occupying space 71 numbered "6".

Thus any man which must be moved by a player into his opponent's territory is captured and lost and is taken out of the game. All spaces numbered "0" on the home line are deemed to belong in the territory of either player so that men moved to such "0" spaces are not to be captured. However, if no move of any of his other men is possible, the player must move a man on a "0" space into the opponent's territory. Thus, if a player should have a man in space 68, number "19" and a man on the home line; and if he should dial "3", then since the man in space 68 cannot be moved to any number "16" in a straight or diagonal line, then the man on the home line occupying for instance space 73 must be moved to opponent's space 74 and is lost. However, any man of either player on the home line and occupying one of the safety zones 59 need never be moved; and if no other move is possible, the player simply loses his turn. Likewise, when a number is spun on the dial and a player cannot by going in a straight or diagonal line move his man either to another space in his own territory or to a space in his opponent's territory, then he merely loses his turn.

When the game is finished by one player's succeeding in moving all of his remaining men to the home line, then scoring of each player is based on the number and location of each of the remaining men of each of the players.

Thus, for instance, it may be established as a rule during the game or by the manufacturer, that men who at the end of the game occupy the safety zone may be scored as 5 points, men on the home line but not in the safety zone may be scored as 2 points, and men in other squares as 1 point each; the winner obviously being the player with the greatest number of points. It is thus clear that the player who first gets all of his men on the home line is not necessarily the winner.

Interest is thereby added to the game by the fact that while at the outset of the game it is most advantageous to attempt to reach the home line quickly and to place as many men as possible thereon; towards the end of the game, particularly when one player has less men than the other, it may be disastrous for him immediately to move all his men to the home line since the game would end when he has a numerical disadvantage.

The combination of various moves possible in this game, the necessity for performing a mathematical operation of subtraction or addition in order to make each move, the necessity even for performing several such operations during each move in order to determine which of several particular possible moves is the best one, the necessity for exercising judgment in selecting the best of several possible moves, all comprise operations which tend to create an educational game of the highest possible order. Added to these advantages are the practise in reasoning and judgment, the element of chance involved and the further element of skill in the selection of moves.—making this an entertaining and intriguing game, useful not only for children but enjoyable by adults as well.

There are many possible variations of this game. Thus where it is desired to construct a game which will facilitate instruction in mathematical operations of various kinds including addition, subtraction, multiplication and division, an alternating form of game, parts of which are shown in Figures 6 and 7 may be used.

This alternative form may, of course, be called by any name which may be deemed advisable in the manufacture and use thereof. However, in order to distinguish this variation or alternative form of game from the form already described, we have denominated this game "Arabic series" instead of "Arabic checkers." And the various operations of addition, subtraction, multiplication and division have been called by use, for purposes of use, "Adit," "Dimino," "Factor" and "Divido," each of these names being used where, in the particular game, a corresponding mathematical operation is constantly to be performed.

As will be seen, it is possible, of course, that all of the operations or any combination of the operations may be performed in the same game. Thus, the modified form of "Arabic series" is a game for entertainment as well as for instruction and practice in the four arithmetical processes.

The particular form of Arabic series which we have called "adit" consists of a deck of cards and of an equal number of disks. As seen in Fig. 6, on the face of each card 80 is printed an addition combination, the entire deck containing all possible addition combinations from any starting combination such as 1+1 up to any desired group of numbers. A disk 81 bearing but a single number giving the sum of the numbers printed on the card is provided corresponding to each card in the deck.

In the case of "Dimino" the same type of deck of cards and disks would be used and the same relationship between the numbers on the disk and the cards prevail, but the face of each card 80 would have printed thereon a subtraction combination, the entire deck containing all subtraction combinations from any desired starting grouping of numbers such as 1−1 to any desired limit. The disks 81 then, of course, contain numbers corresponding to each of the cards, such numbers representing the remainder or difference between the two numbers printed on each card.

"Factor" is an exactly similar game consisting likewise of a series of cards 80 and a corresponding series of disks 81 but wherein the face of each card is imprinted with a multiplication combination, the cards themselves comprising as many possible combinations starting with, for instance 1×1, the limit being set by the difficulty which the particular game should have and the number of cards which should be provided for use in the game. Each of the disks 81 in such case will, of course, then show the product of the numbers on the corresponding cards.

"Divido" is another minor variation of the game "Arabic series" in which each of the cards 80 is imprinted with a division combination and wherein each of the disks 81 gives the quotient of the corresponding card.

The decks may as is obvious, be constructed so as to include any desired combination cards comprising addition, subtraction, multiplication or division in a single deck or to combine any two or more of these processes in the same deck.

Each deck may contain several cards bearing a symbol which may entitle the player to draw an extra disk as hereinafter described; and in order to facilitate the progress of the game, each deck may contain a "referee" card giving the answers to all of the combinations in the deck.

Naturally the very arrangement of the numbers on the cards themselves and the construction of the deck will permit the withdrawal or setting aside of cards containing combinations too difficult for the particular players before the game is begun.

In order to facilitate such separation, each deck may contain cards of different colors, as for example, yellow and blue cards, the cards of one color, the blue cards for instance, giving only the more elementary combinations while the yellow cards give the more difficult combinations. The disks may have the same colors as the corresponding cards. The beginners or younger children might then play with the blue cards and disks, while the adults might play with the full set or with only the yellow disks and cards.

Arabic series may be played by two or more players, the number of players being limited by the number of cards and disks in the particular game. Cards and disks are shuffled and five cards are given to each player while the disks are placed face down in the center of the table as seen in Figure 7. Each player lays his cards up in front of him. One of the players, preferably the player to the left of the dealer, opens the game by drawing one disk and placing it face up in the center of the table. If this disk is equal to the sum of the numbers (in the case of adit) on any one of that particular players cards, he may take the card with the disk and set it aside. The player now draws an additional card from the deck in the center of the table so that his set of five cards may remain complete. If the player cannot match the disk, he leaves the disk face-up in the center of the table and passes. The next player may, if he can match that particular disk, take that disk and set it aside with the appropriate card or he may draw another disk from the center of the table and attempt to match it. The game is finished when all of the cards of the deck have been used or when one player is left without cards.

The winner is the one who has matched the most cards. In case of dispute, a "referee" card is provided for consultation.

Each deck may have cards bearing symbols such as stars which may count for extra points and other variations may be made in the game in order to lend additional entertainment value thereto.

In each case, whether the game played is adit, dimino, factor, or divido, the playing of the game and the operations with respect thereto are the same. The player attempting to match a disk with the result (sum, difference, product or quotient) of the mathematical operations indicated on a card in his possession. It is clear, therefore, that the game may conveniently be played in combination, that is, that cards in a single game may contain addition, multiplication, division or subtraction operations or any combination of one, two or more of these operations.

We have found that for more advanced children as well as for adults, a variation of this type of game increases both its educational and entertainment value. This variation we have called "Numograms." Numograms likewise is a game which apparently is primarily for the purpose of entertainment but which furnishes instruction and practice in the four fundamental processes of addition, subtraction, multiplication and division.

Figure 4:
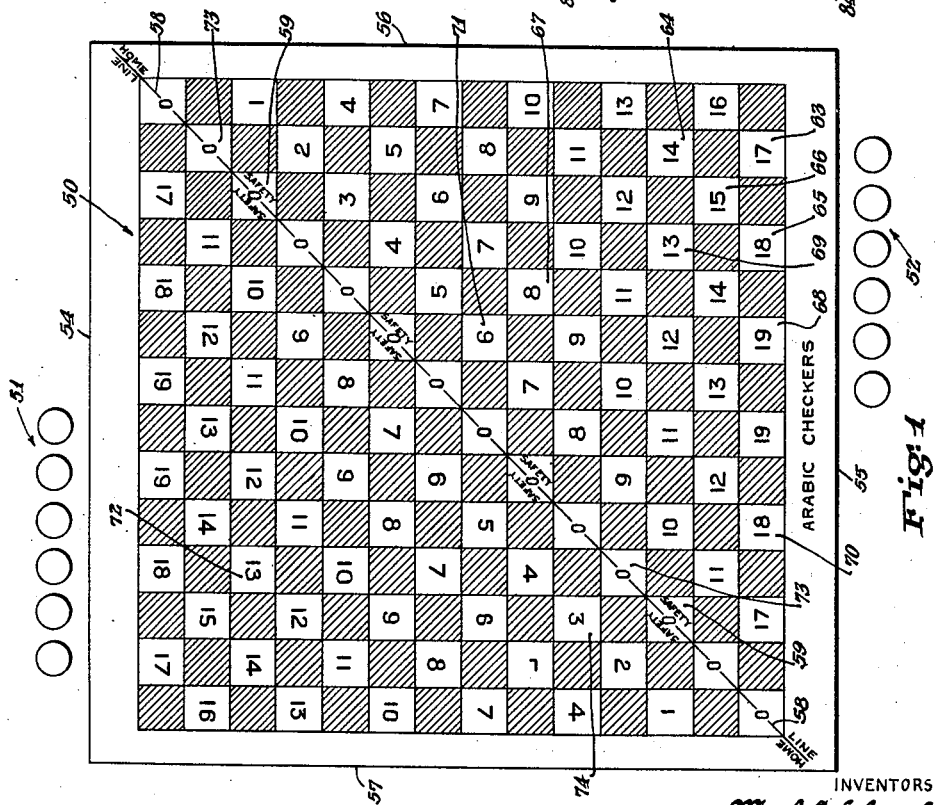
Figure 4 is a view in perspective of a group of blocks for use in connection with our game.

Numograms in its preferred form consists of a number of blocks, disks or small cards such as seen in Figure 4 on each of which is printed one number or an arithmetical sign such as plus (+), minus (−), times (×), divided by (÷), or equals (=). Even algebraic symbols and algebraic operators such as ( ), or chemical elements or radicals may be inscribed thereon for more advanced players, and even extremely difficult operations such as $\sqrt{\phantom{x}}$ or $\sqrt[3]{\phantom{x}}$. The game may be played, as is hereinafter described, on the table, as seen in Figure 5, without any other apparatus except the cards, disks or blocks carrying the numbers or symbols imprinted thereon; or it may be played on a board, such as that shown in Figure 3, said board being made of any suitable material such as cardboard or wood. Numograms may be played by two or more players, the limit on the number of players being fixed by the number of blocks or disks which are present in the set.

The blocks, having been shuffled, are placed face down in a circle with a space in the center for turned up blocks as hereinafter described. The blocks bearing the equals (=) sign are placed in a separate pile, face up. The first player turns one block face up and places it in the center of table (the pot). Each player follows in turn. When any player is able to make an equation he takes the blocks forming this equation from the pot and places them in front of him as seen in Figure 5.

To complete the equation the player may draw a block from the "equals" pile, this not being considered a new turn. Completing an equation gives the player the right to draw an extra block. The game continues until any one player has made the number of equations which the players have previously agreed will constitute the game, the player first reaching the goal (ten, fifteen or more equations) being declared the winner.

Thus, for example, the first player turns over a 6 and leaves it in the pot; the second player may turn over a 12, and leave it in the pot. The next player may turn over an 18 and the next player to move may turn over a minus (−) sign; in which case, as seen at 82 of Figure 5, the player turning over the number or sign which enables him to complete an equation, takes the numbers and symbols in the pot, takes an equals sign from the equals pile, forms the equation 18−12=6 and places that equation in front of him.

Any player may capture or take away an equation from any of his opponents, provided he can use all the numbers and signs included in that equation and also provided he can add other numbers or signs from the pot of turned up numbers, or in combination with the numbers or symbols he has just turned up, to form a new equation.

For example, if after the equation 82, Figure 5, has been formed, and placed before him by the player forming it, another player should turn up a ÷ sign and be required to leave it face up in the center of the table and the next player should then turn up a 3; that next player may then take the division sign, the 3 which has just turned up, may capture equation 82 of Figure 5, form the new equation 18÷3=12−6, capture equation 82 and place that equation in front of him as for instance at 83. It is thus clear that in the illustration herein given, when the player captures such equation and places equation 83 in front of him, the player originally having equation 82 has lost the same and thereafter does not have it. In the formation of equations, it is preferred that the strict rules of arithmetic be followed. Thus, when numbers are joined by × or ÷ they are considered bracketed together unless otherwise shown by the use of brackets. Thus 4+16÷4 is always deemed to mean 4+(16÷4) or 4+4 and not (4+16)÷4 which would be 5. The game may be similarly played with algebraic symbols or chemical equations of various types, as is seen in Figure 5a.

When the board of Figure 3 is used, it may be used as a field on which to play, the blocks being conveniently accommodated thereon, the squares on the board 84 of Figure 3 being used to receive a single block or card so that a design may be built up in playing the game. The board is divided preferably into a series of squares or rectangles corresponding to the size of the blocks. It is divided into an inner field 85 and an outer field 86, the inner field being located more or less centrally on the board. The line 87 defining the inner field may be used as a starting point for the first equation so that the designs built on this first equation may branch out in all directions, the number of squares on the board limiting the extent to which one may build in any one direction.

Thus the game, when the board 84 is used, may be played in a variety of ways. The players may still merely lay out their equations and seek to capture the one from the other, or a player may attempt to build on another's equation in which case the player who at the end of the game has laid out or placed the greater number of cards or blocks or equations on the board may be declared the winner. Thus, for instance, the first equation placed on the board may be that shown at 88 of Figure 3, 8+4=12. The next player may then be able to lay down an ×, a 3 and a 4, in which case he would place those numbers as shown at 89 together with the = sign.

This variation of the game may be advantageously used in a game which we have called "Cross-way Numograms." In this case the first equation completed is placed on the board inside the inner field 85. From this point each player draws two blocks during each turn. The second equation must be built on one of the numbers or signs constituting the first equation. As the game continues, each new equation must continue a previously built equation or use in its combination a sign or number of any equation present on the board. For example, the first equation made on the board may be $$18-12=6$$

A subsequent player finds in the pot a disk which is face up bearing the symbol × and then in turning up his two blocks or cards, he turns up a 3 and a 2. He may then continue the equation which becomes 18−12=6=3×2. Later a player may find in the pot a plus (+) sign and may turn up a 4 and a 16. He now uses these symbols as shown at 90 of Figure 3. The game continues, the equations branching out in all directions but reading always only right to left and top to bottom. Thus, a player when he finds the proper symbols may not write an equation reading from point 91 in a direction towards the top of the board but must write the equation so that it reads from the top down. Thus as an illustration, a player may be able to find for use the symbols 12, −, and 6, whereupon he may place the equation at 92 thus continuing the series. It will be noted that should the equation be read up in an upwardly direction we would have situation where +6 would equal −6 or −6=−6.

No equation may be placed on the board so that any other equation will no longer be correct or becomes meaningless. Thus, for instance, the symbols placed at 92 of Figure 3 could not be 6×3 since, although that equals 18, it does not equal 18−12 and thus would render the equation meaningless.

In the game of Crossway numograms whenever the player completes an equation, he makes a score of 1 point. When in the course of building an equation he closes a square or oblong, he makes a score of 5 points. Thus where a player is able to place a division symbol (÷) at 93 and the equals sign (=) at 94, and the number 8 at 95, thus completing the equation 16÷2=8, then he, as is seen in the figures, completes the oblong or square $$\begin{array}{c} 12+4=16 \\ = \quad - \\ 6=3\times 2 \end{array}$$

In this game, therefore, the player who wrote the equation 16−2=8 receives the 5 points. As in the prior games, herein described, the players decide before the commencement of the game what final score shall be the winning score.

Many variations of the game herein described are, of course, possible. However, the common principle present among them all is that in the process and conduct of the game it shall be necessary to perform various mathematical or arithmetical combinations, but that the very performance of those operations should not comprise a task but in itself should furnish entertainment to the player. The games, although they may be educational from the point of view of the younger players, nevertheless remain games in the true sense in that the elements of skill and judgment as well as knowledge are never overlooked. They may thus be played by adults for their entertainment value alone.

Although we have described several modifications of the principle of our games, we prefer to be limited, not by specific disclosures herein but only by the appended claims.

This application is a division of application Serial No. 248,222, filed December 29, 1938.

What we claim is:

1. A rectangular gameboard having squares; a home line on said board drawn diagonally thereon and intersecting opposite corners thereof dividing said board into two right triangles; numerical indicia in alternate squares; the values of said numerical indicia being greatest at opposite ends of said board and decreasing progressively toward said home line; the two triangles on either side of the home line being harmonious in their arrangement; the squares intersected by said home line having no numerical value.

2. A rectangular gameboard having squares; a home line on said board drawn diagonally thereon and intersecting opposite corners thereof dividing said board into two right triangles; numerical indicia in alternate squares; the values of said numerical indicia being greatest at opposite ends of said board and decreasing progressively toward said home line; the two triangles on either side of the home line being harmonious in their arrangement; the squares intersected by said home line having no numerical value; a plurality of said last mentioned squares having indicia thereon indicating that they are safety zones.

MARK J. SCHOENBERG.
HARRY I. MAXIMON.